July 21, 1931.                 J. BRINCIL                    1,815,344

BUSHING BEARING AND METHOD OF MAKING IT

Filed July 9, 1928

INVENTOR
*Joseph Brincil*
BY
ATTORNEY

Patented July 21, 1931

1,815,344

UNITED STATES PATENT OFFICE

JOSEPH BRINCIL, OF READING, PENNSYLVANIA

BUSHING BEARING AND METHOD OF MAKING IT

Application filed July 9, 1928. Serial No. 291,334.

This invention relates to bushing bearings and the method of making them.

In the past efforts have been made to reduce the material cost of bushing bearings by the introduction of various percentages of cheaper metals into the various bronze alloys. For example a good bronze alloy for bushing bearings consists of 90 percent copper and 10 percent tin. The metal tin being expensive and copper relatively so, the introduction of such metals as lead or zinc materially reduced the cost of the alloy but at a sacrifice of certain desired bearing characteristics, such as are required of alloys for high speed work or heavy pressures.

It is the object of the present invention to provide an economical means of reducing the material cost of bushing bearings without changing the structure or composition of the alloys.

I proceed by taking a strip of inexpensive metal such as steel and punch a series of outwardly formed or bent lips along the length of the strip. The punched strip is then blasted with steel or cast iron shot to cleanse and roughen the surfaces, or it can be left plain and then cut off to unit lengths and formed into cylindrical form with the lips outermost. The next step consists in placing the lipped steel shell into either a sand mold or permanent mold with a core and casting a molten bearing metal into the mold so as to envelop the cylindrically formed lipped steel strip that is used as a filler. The bearing thus cast is then machined to the desired size.

Figure 1:
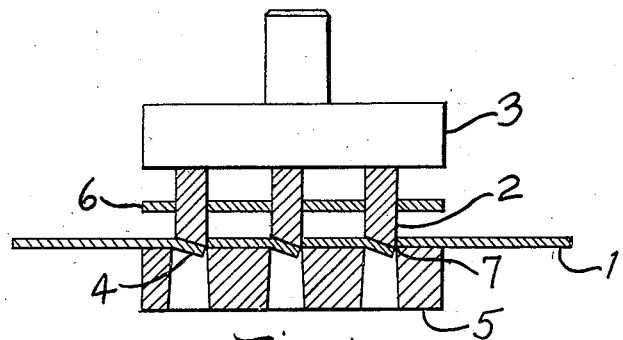
Figure 2:
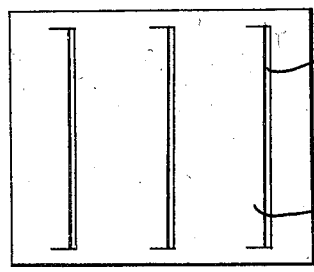
Figures 3, 4:
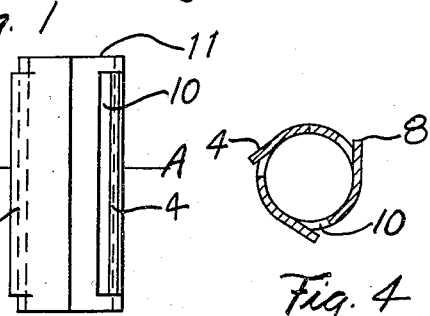
Figures 5, 6:
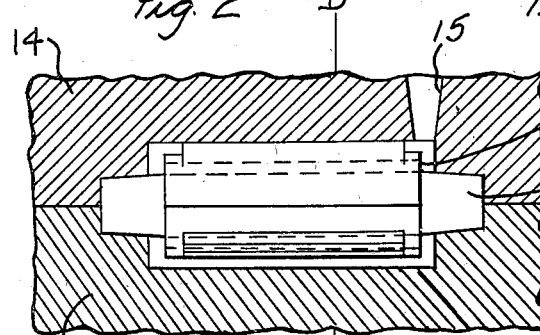
Figures 7, 8:
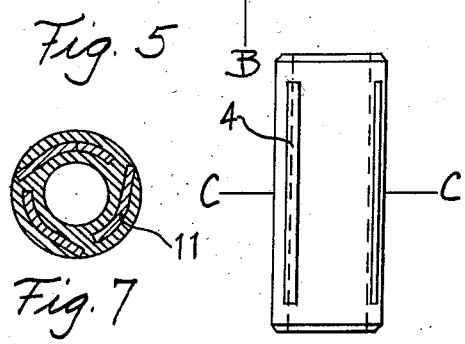
Figure 9:
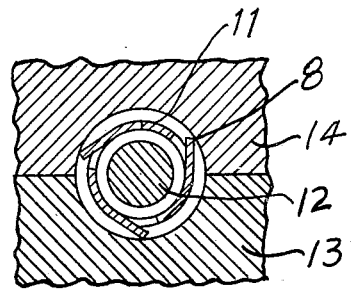

In the accompanying drawings I have illustrated diagrammatically the various steps employed in the manufacture of a bearing in accordance with the present invention. In these drawings Figure 1 is a sectional view of a series of punches, a die, and a steel strip with outwardly punched lips and a stripper. Figure 2 illustrates a plan view of a unit strip used in the manufacture of a single bearing. Figure 3 is a view of the unit strip of Figure 2 formed into cylindrical shape with the punched lips outermost. Figure 4 is a transverse section through A—A of Figure 3. Figure 5 is a longitudinal section thru a mold with the core and formed metal strip in position for pouring. Figure 6 is a transverse section through B—B of Figure 5. Figure 7 is a transverse section of the formed steel strip enveloped by a bearing metal. Figure 8 is a view of the finished bushing bearing. Figure 9 is a transverse section along C—C of finished bearing in Figure 8.

In the drawings 1 represents a strip of steel which is fed beneath the punches 2 contained in the punch holder 3 and a series of lips 4 punched by virtue of the angles on the ends of the punches 2. The punch holder 3 and die 5 are fastened in any suitable punch press and after the lips are punched the punches 2 ascend and lift the steel strip until it is stripped by the stripper plate 6, after which the steel strip 1 is again fed under the punches for the next series of lips. The lips are formed by virtue of a shearing action on only one edge of the die holes as shown by 7 in Figure 1. The punched strip can then be abraded by means of blasting steel or cast iron shot against the surfaces so as to cleanse all foreign matter and at the same time roughen the surfaces so as to permit the molten bearing metal to become firmly imbedded into the abrasions upon solidifying and shrinking. The abrading operation can also be done before the punching operation as this operation has no effect on the punching of the lips. Instead of punching outwardly formed lips in the strip metal, the steel strip can be perforated to any suitable design and serve the purpose fairly well but punching the lips is preferable because of less waste of the filler material.

The abraded and punched strip is then cut into unitary lengths as illustrated in Figure 2 to form a single bearing after which the unit strip is formed into cylindrical form as shown in Figure 3. This forming operation is also done in any suitable punch press with the aid of suitable forming dies so constructed that the points 8 of the outwardly formed lips 4 in Figure 4 are in a circle. After the lips are punched a slight opening in the steel strip takes place as shown by 9 in Figure 2 and this opening becomes larger due to the forming operation as shown by 10 in Figures 3 and 4. The purpose of the outwardly formed lips is two-fold; the lip points 8 of Figure 4 being concentric with the main cylindrical steel body will serve to keep the filler metal or steel sleeve 11 central when placed in a mold as shown in Figure 5. This permits the bearing metal to flow on both sides of the filler metal sleeve 11. The other advantage of the outwardly formed lips is the opening 10 of Figures 3 and 4 which takes place without perforating or the loss of any metal, and serves an important advantage in that it permits the molten bearing metal to fill up this opening and form a strong bond between the bearing metal on the exterior and interior of the filler metal sleeve 11.

Figure 5 illustrates the inexpensive filler metal sleeve 11 in position with the sand core 12 ready to receive the molten bearing metal. Figure 5 is a longitudinal section of one of a number of molds which are rammed up from a pattern consisting of fifty or one-hundred bearing forms all of which are united to each other by gates so as to permit pouring all at one time. In Figure 5 the numeral 13 represents the drag and 14 shows the cope of the mold with the pouring gate 15. In Figure 6 is shown a transverse section of B—B in Figure 5 and clearly illustrates the function of the lip points 8 in keeping the main body of the filler metal sleeve 11 central in the bore of the mold. Figure 7 illustrates a transverse section of an unfinished cast bearing metal enveloping the steel filler sleeve 11. Figure 8 represents a finished bushing bearing with the outside diameter machined to the desired size. This machining operation on the outside diameter partly exposes the lips 4 of the steel metal filler sleeve, and is of little consequence as regards corrosion because on pressing the bushing bearing in a housing the exposed steel lips are well protected from the elements. Figure 9 is a transverse section of Figure 8 along C—C and shows the finished bearing on the interior and exterior with an equal distribution of the bearing metal on both sides of the steel filler 11.

While I have used sand molding for purposes of description, this invention can also be used to good advantage in the die-casting art where permanent molds and cores are used, and molten metal is cast by means of pressure.

I claim:—

1. The method of making a bushing bearing which comprises punching a series of lips in a strip of inexpensive metal, forming said strip into cylindrical form with the lips outermost, then placing a core thru said formed strip, then placing said formed strip and core into a mold with the lips on said formed strip abutting the walls of the mold, and casting a molten bearing metal into the mold to envelop the said formed strip.

2. The method of making a bushing bearing which comprises punching a series of lips in a strip of inexpensive metal, forming said strip into cylindrical form with the lips outermost, then placing a core thru said formed strip, then placing said formed strip and core into a mold with the lips on said formed strip abutting the walls of the mold, and casting a molten bearing metal into the mold to envelop the said formed strip, and then finishing the resultant product to the required size.

3. The method of making a bushing bearing which comprises punching a series of lips in a strip of steel, forming said strip into cylindrical form with the lips outermost, then placing a permanent core thru said formed strip, then placing said formed strip and permanent core in a permanent mold with the lips on said formed strip abutting the walls of the permanent mold, and die-casting a molten bearing metal into the permanent mold to envelop the said formed strip, and then finishing the resultant product to the required size.

In testimony whereof I affix my signature.

JOSEPH BRINCIL.